United States Patent
Candelore et al.

(10) Patent No.: US 10,264,206 B1
(45) Date of Patent: *Apr. 16, 2019

(54) ACCESSIBILITY REMOTE CONTROL FOR THE BLIND

(71) Applicant: Sony Corporation, Tokyo (JP)

(72) Inventors: Brant Candelore, Escondido, CA (US);
Mahyar Nejat, San Diego, CA (US);
Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,591

(22) Filed: Oct. 30, 2018

Related U.S. Application Data

(63) Continuation of application No. 15/893,370, filed on Feb. 9, 2018, now Pat. No. 10,148,901.

(51) Int. Cl.
*H04N 5/44* (2011.01)

(52) U.S. Cl.
CPC ... *H04N 5/4403* (2013.01); *H04N 2005/4408* (2013.01); *H04N 2005/4412* (2013.01)

(58) Field of Classification Search
None
See application file for complete search history.

(56) References Cited

U.S. PATENT DOCUMENTS

| | | |
|---|---|---|
| 4,700,377 A | 10/1987 | Yasuda et al. |
| 5,327,176 A | 7/1994 | Forler et al. |
| 5,373,330 A | 12/1994 | Levine |
| 6,130,624 A | 10/2000 | Guyer |
| 6,320,621 B1 | 11/2001 | Fu |
| 6,457,681 B1 | 10/2002 | Wolf et al. |
| 6,532,592 B1 | 3/2003 | Shintani et al. |
| 8,629,754 B2 | 1/2014 | Schafer et al. |
| 9,538,251 B2 | 1/2017 | Aravamudan |
| 9,720,640 B2 | 8/2017 | Pedersen et al. |
| 9,743,032 B2 | 8/2017 | Robinson |

(Continued)

FOREIGN PATENT DOCUMENTS

| | | |
|---|---|---|
| CN | 202872895 U | 4/2013 |
| KR | 20000061853 A | 10/2000 |
| WO | 2013028566 A2 | 2/2013 |

OTHER PUBLICATIONS

"X1—TV is universal. Access should be as well." Retrieved on Nov. 15, 2017 from https://www.xfinity.com/accessibility.

(Continued)

*Primary Examiner* — Carlos Garcia
(74) *Attorney, Agent, or Firm* — John L. Rogitz

(57) ABSTRACT

A remotely controlled device receives a first command from a remote control (RC) but does not execute the command. Instead, the remotely controlled device waits to receive the first command within a threshold period, and if not received twice within the period, the first command is then executed. However, the first command is not executed if it is received twice, at which point the name of the corresponding RC key is announced. A second double command caused by a second double press of the same key on the RC causes the remotely controlled device to announce the function of the key. The logic may be executed in the RC as well as or in lieu of executing it in the remotely controlled device.

20 Claims, 4 Drawing Sheets

Display device - centric

Remote control - centric

(56) References Cited

U.S. PATENT DOCUMENTS

| | | |
|---|---|---|
| 2004/0090424 A1 | 5/2004 | Hurley et al. |
| 2005/0114761 A1 | 5/2005 | Celik |
| 2005/0212685 A1 | 9/2005 | Gordon |
| 2007/0266152 A1* | 11/2007 | Chen .................. G06F 21/34 709/225 |
| 2010/0060505 A1 | 3/2010 | Witkowski et al. |
| 2010/0138918 A1* | 6/2010 | Kim .................... G06F 21/83 726/22 |
| 2010/0158481 A1 | 6/2010 | Kaneko et al. |
| 2010/0235745 A1 | 9/2010 | Shintani |
| 2010/0286653 A1 | 11/2010 | Kubel et al. |
| 2011/0140847 A1 | 6/2011 | Schafer et al. |
| 2011/0157467 A1 | 6/2011 | McRae |
| 2013/0073998 A1 | 3/2013 | Migos et al. |
| 2013/0314598 A1 | 11/2013 | Koizumi |
| 2014/0111315 A1 | 4/2014 | Geerlings et al. |
| 2014/0160362 A1 | 6/2014 | Shintani et al. |
| 2015/0348402 A1 | 12/2015 | Lim et al. |
| 2017/0235412 A1 | 8/2017 | Cheong |

OTHER PUBLICATIONS

Brant Candelore, Mahyar Nejat, Peter Shintani, "Accessibility Menu from Remote Control", file history of related U.S. Appl. No. 15/631,791, filed Jun. 23, 2017.

Brant Candelore, Mahyar Nejat, Peter Shintani, "Accessibility Menu from Remote Control", related U.S. Appl. No. 15/631,791, Non-Final Office Action dated Nov. 29, 2018.

Brant Candelore, Mahyar Nejat, Peter Shintani, "Accessibility Menu from Remote Control", related U.S. Appl. No. 15/631,791, Applicant's response to Non-Final Office Action filed Nov. 30, 2018.

* cited by examiner

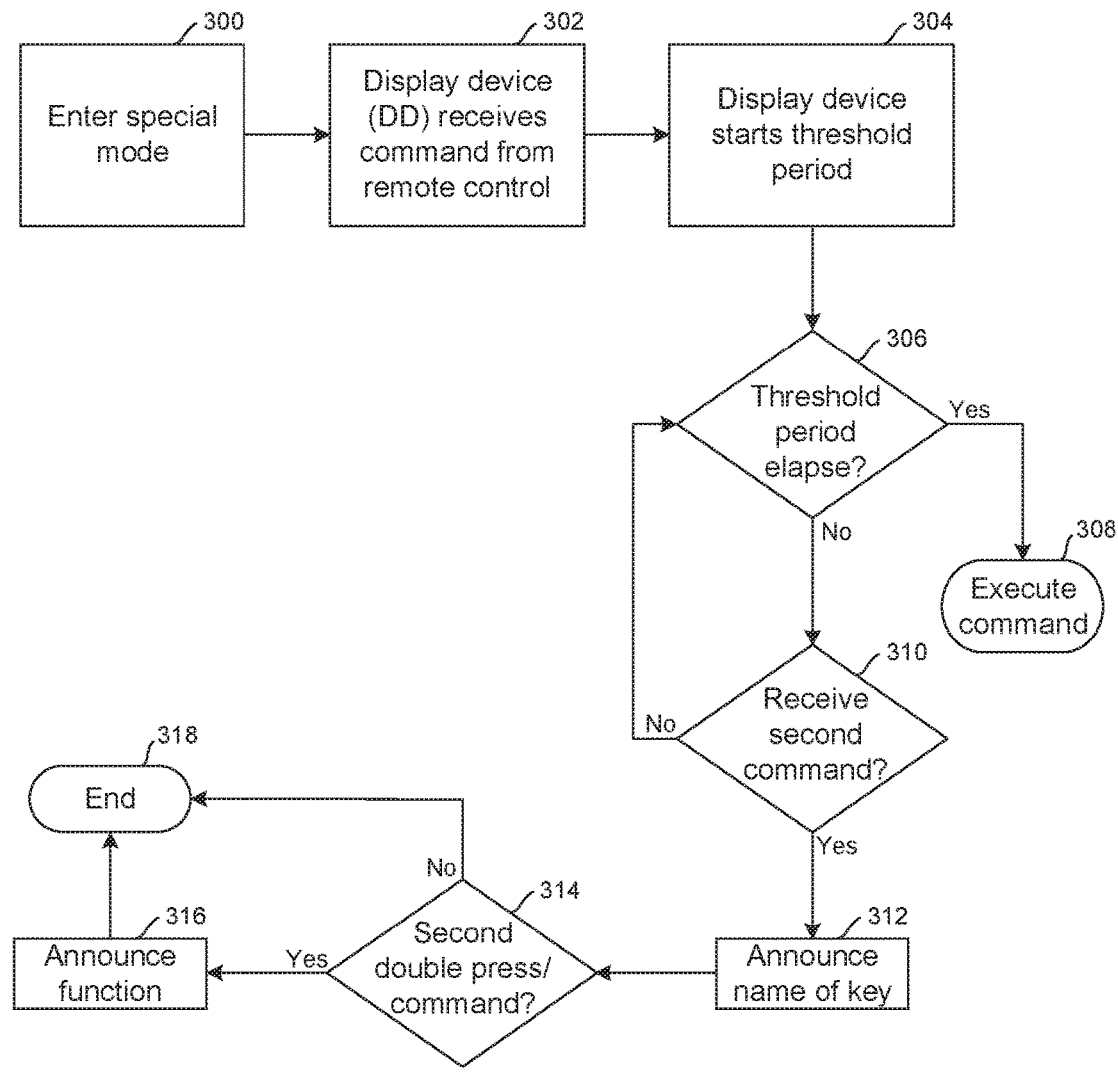
FIG. 3  Display device - centric

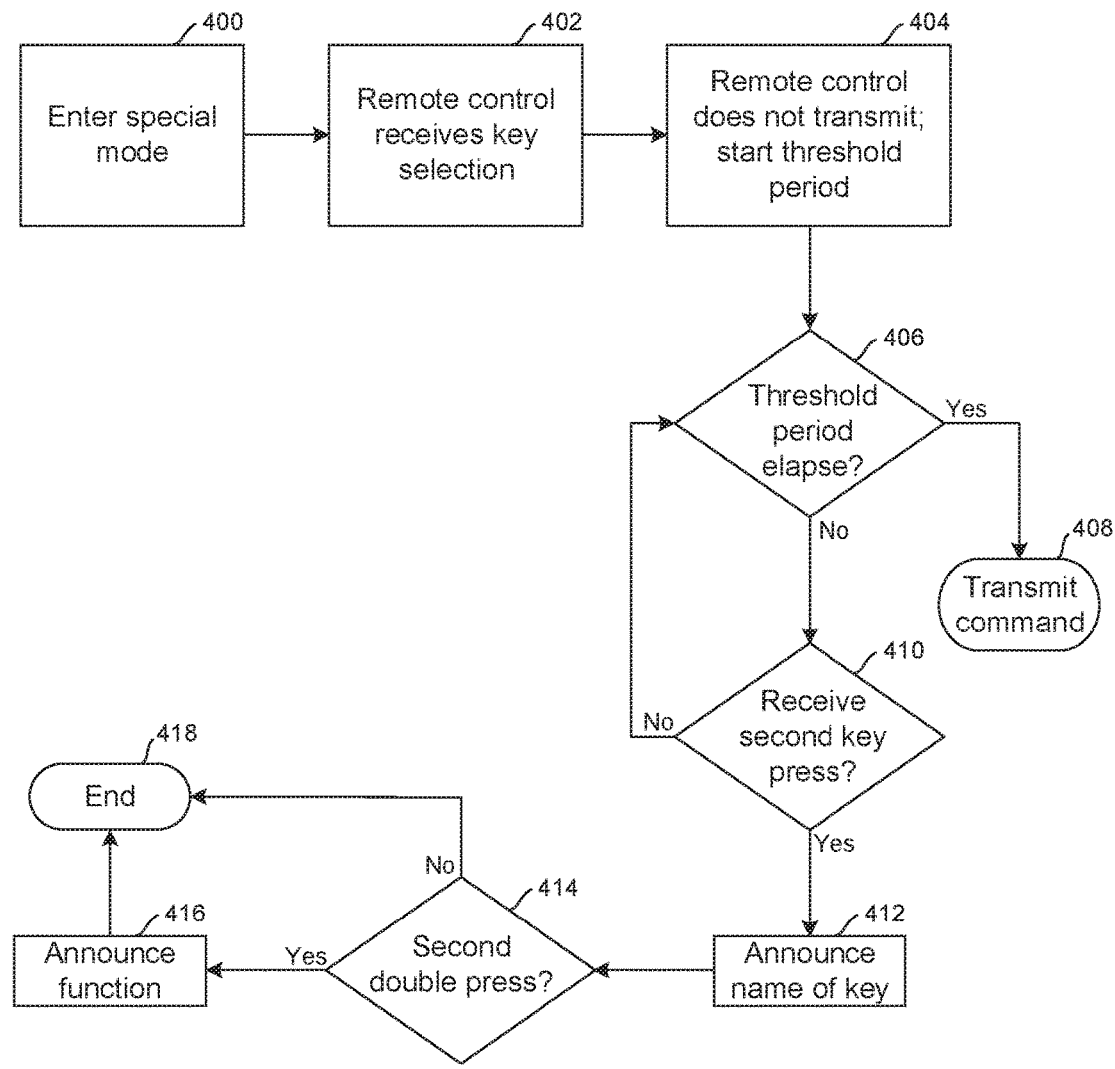
FIG. 4 Remote control - centric

ACCESSIBILITY REMOTE CONTROL FOR THE BLIND

FIELD

The present application relates to technically inventive, non-routine solutions that are necessarily rooted in computer technology and that produce concrete technical improvements.

BACKGROUND

A typical rectangular remote control (RC) may have dozens of buttons, e.g., up to 50 or more. Furthermore, RCs have no real standardization. Consequently, the blind must learn what each button is and where it is located on the remote control or smart screen of a mobile device. When the RC has dozens of keys, then this can be very daunting.

SUMMARY

Present principles recognize the above problems and so provide a system in which a remote control (RC) can have many keys, with single key manipulations being processed conventionally (perhaps after a short wait period to determine if a double press is in the offing) but with inventive multiple key press features in a special accessibility mode that can be activated and deactivated as desired. In the accessibility mode, a disabled person such as a blind person can double press a key, which causes a controlled device such as a TV to cancel execution of the command associated with a single press of the key and announce (e.g., via speakers) the name of the double-pressed key without executing any function associated with the key. The disabled person may then double press the same key again and the controlled device announces a description of the function of the key, which may depend on the application running in the TV. The technique is helpful for not only the blind but also for the cognitively impaired that want to know what the buttons on the remote control do.

Accordingly, a system includes a display device (DD) configured to receive wireless commands from a remote control (RC). At least one circuit in the DD is configured to receive from the RC a first command. The circuitry is configured to, responsive to the first command, commence a time period, and responsive to not receiving the first command a second time within the time period, execute the command. The circuitry is configured to, responsive to receiving the first command a second time within the time period, not execute the command and present information pertaining to a first key on the RC associated with the first command.

In some examples, the circuitry is configured to, responsive to receiving the first command a second time within the time period, not execute the command and present information pertaining to the first key on the RC associated with the first command, with the information including a name of the first key. The circuitry may be configured to, responsive to receiving the first command at least a third time, present enhanced information pertaining to the first key on the RC associated with the first command, with the enhanced information including a function of the first key.

In example embodiments, the circuitry is configured for playing the information on the at least one speaker of the DD. In examples, the circuitry can be configured for configuring the DD in a training mode responsive to receiving a command caused by selection of a special key on the RC. The training mode is associated with presenting the information associated with the first key. Or, the circuitry can be configured for configuring the DD in the training mode responsive to selection of plural keys on the RC.

In another aspect, a system includes a remote control (RC) with plural keys selectable to cause the RC to send respective wireless commands from a wireless transceiver of the RC to a display device (DD). Circuitry in the RC is configured to receive a selection of a first key, and responsive to receiving the selection of the first key, commence a time period but not transmit to the DD a command associated with the first key. The circuitry, responsive to not receiving a second selection of the first key within the time period, transmits to the DD a command associated with the first key. On the other hand, responsive to receiving a second selection of the first key within the time period, the circuitry presents information pertaining to the first key.

In another aspect, a method includes receiving at a display device (DD) a wireless first command from a remote control (RC), and starting a threshold period responsive to the first command but not executing the first command until the threshold period elapses. The method also includes presenting information related to a first key on the RC associated with the first command responsive to receiving the first command within the threshold period.

The details of the present disclosure, both as to its structure and operation, can be best understood in reference to the accompanying drawings, in which like reference numerals refer to like parts, and in which:

BRIEF DESCRIPTION OF THE DRAWINGS

FIGS. 3 and 4 are flow charts illustrating example logic consistent with present principles.

DETAILED DESCRIPTION

Figure 1:
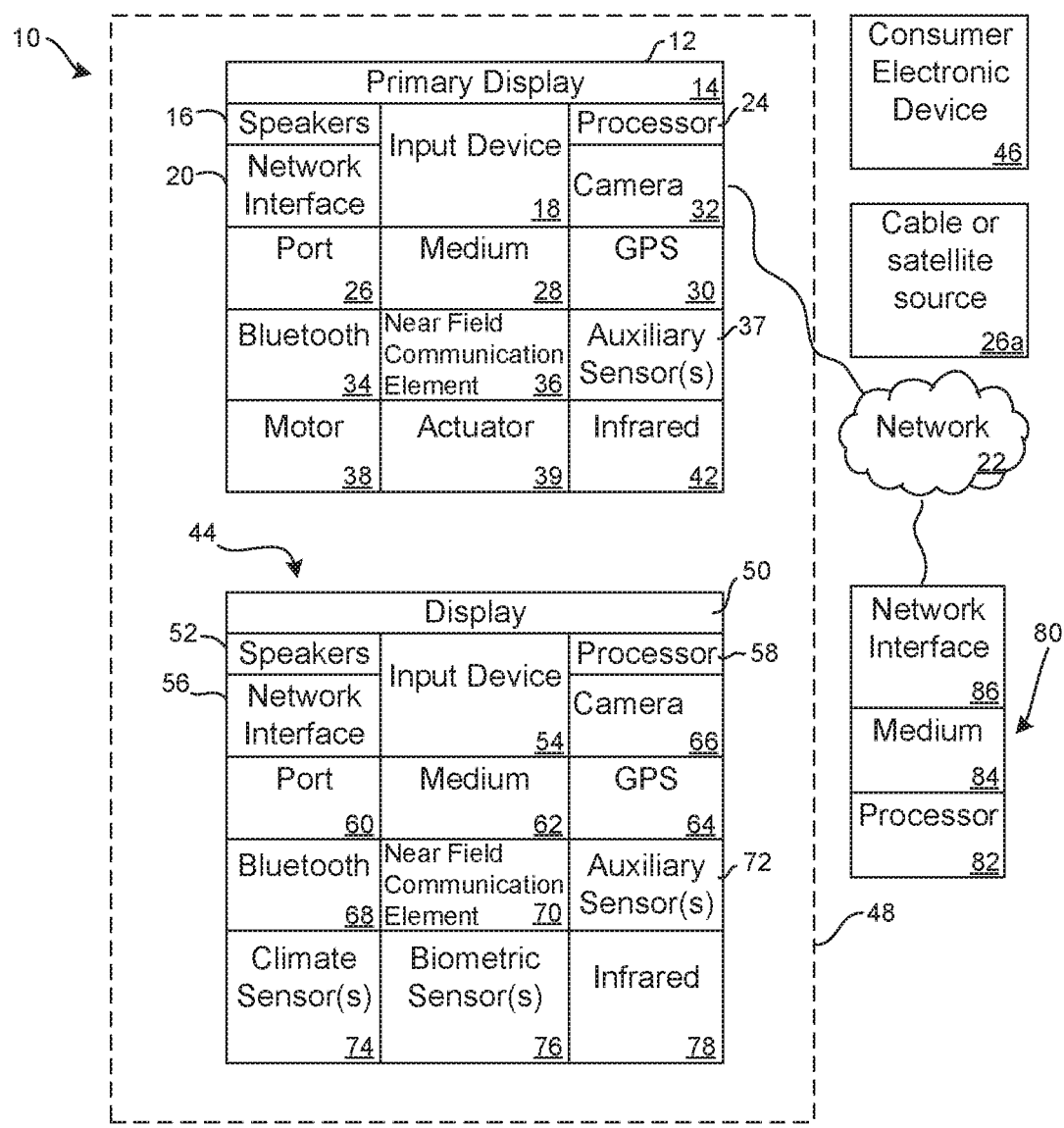
FIG. 1 is a block diagram of an example system including an example in consistent with present principles.

This disclosure relates generally to computer ecosystems including aspects of consumer electronics (CE) device-based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof, hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B. or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/ microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
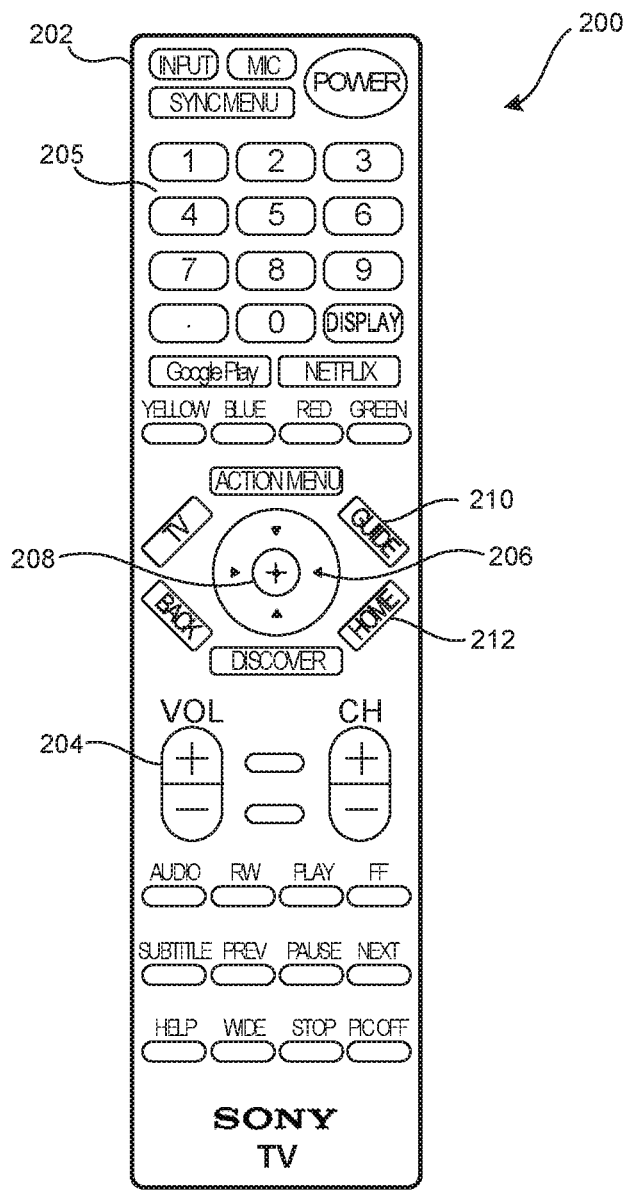
FIG. 2 is a plan view of an example remote control (RC) consistent with present principles.

FIG. 2 shows a remote control (RC) 200 that may include appropriate components of the above-described CE device 44 or 46. Thus, the RC 200 may include one or more internal processors, computer memories, and wireless transmitters such as IR command transmitters to control a device such as the AVDD 12.

As shown, the RC 200 includes a typically plastic, hand-holdable housing 202 with multiple input keys that can be manipulated by a person to cause wireless commands to be sent from the RC 200 to, e.g., the AVDD 12. For example, volume up and down keys 204 may be manipulated to respectively turn the volume of the speakers of the AVDD 12 up and down. An alpha-numeric keypad 205 may be provided on the RC 200 for inputting letters and/or numbers to the AVDD 12. Also, a directional input element such as a rocker 206 or directional keys may be provided with each arm of the rocker being manipulable to move a screen cursor up and down and left and right. If desired, a select key 208 may be located in the center of the rocker 206 for input of a "select" command.

Further, in the example shown the RC 200 may include a guide key 210 manipulable to send a command to present an electronic program guide (EPG) on the AVDD 12. Also, a home key 212 may be provided and can be manipulated to invoke a home menu. A special accessibility key may be provided. As shown, many other keys also may be provided, making the task for a blind person to learn the functions of the keys daunting.

FIG. 3 illustrates logic that may be executed by a display device (DD) such as the AVDD 12 shown in FIG. 1. While FIGS. 3 and 4 are shown in flow chart format for description, it is to be understood that state logic equivalently may be used.

Commencing at block 300, if desired a special mode may be entered. The mode may be entered by receiving a command from an RC such as the RC 200 generated by a selection of a special key such as the accessibility key or generated by selection of a predetermined sequence of conventional keys, such as the simultaneous press of two keys or sequential press of the first two keys in the top row of the RC, or other pattern. In some embodiments entry into special mode may be dispensed with and the ensuing logic always performed. The special mode may be disabled by pressing the accessibility key or sequence of keys a second time.

Moving to block 302, the DD receives a first command from the RC, typically initiated by a person manipulating a key on the RC corresponding to the command. At block 304 the DD starts a threshold period counter without executing the command. The period should be long enough to permit the person to press the key again but short enough not to cause undue lag in executing otherwise desired commands. A period of one second is an example period.

Proceeding to diamond 306, the DD determines whether the threshold period has elapsed with no further commands being received. If the period has elapsed, the logic executes the command at state 308.

On the other hand, if the threshold period has not yet elapsed, the logic moves to decision diamond 310, which represents another command being received (if no other command is received the logic conceptually loops between diamonds 306 and 310 until the threshold period elapses, it being understood that state logic is encompassed in this description as well). Assuming the command received at diamond 310 is the same (first) command, the logic moves to block 312 to announce, e.g., on speakers and/or visual display of the DD, the name of the key on the RC corresponding to the received command for the particular application being executed by the DD. If the command received at decision diamond 310 is not the first command but rather a different, second command, the logic may proceed in any one of several ways, such as resetting the threshold period and waiting for a second reception of the second command, or by executing the first command, or by executing the second command, or by executing both commands, or by ignoring both commands, and/or by announcing an error, etc.

From block 312 the logic moves to decision diamond 314 to determine whether a second press or double press of the first key as indicated by reception of one or two more of the first commands has been received. Note that a second threshold period may be established from reception of the first double press in which to receive the second double press and if a second double press is received outside the second threshold period, the logic begins anew at the beginning. If a second double command is received (within the second threshold period if used), the logic moves to block 316 to announce (e.g., via speakers and/or visual display) the function of received command, i.e., the function of the corresponding key on the RC. From block 316 or from decision diamond 314 if the test there is negative, the logic can end at state 318.

The logic may thus loop iteratively, successively announcing but potentially never executing a series of commands caused by double press RC key selections in the special mode, until such time as a command is executed upon reception of a single press of a key and elapse of the threshold period for waiting for a second command from the same key. Note that the DD may access audio files, with each audio file corresponding to a respective name and/or function one of the keys on the RC and play the audio file responsive to multi-selection of the associated key.

FIG. 4 illustrates an alternative embodiment in which present principles may be implemented in an RC such as the RC 200. Circuitry such as one or more of the above-described processors/DSPs etc. may be provided in the RC 200 and may be configured to, at block 400, optionally enter a special training. The mode may be entered by receiving a selection of a special key such as the accessibility key or generated by selection of a predetermined sequence of conventional keys, such as the simultaneous press of two keys or sequential press of the first two keys in the top row of the RC, or other pattern. In some embodiments entry into special mode may be dispensed with and the ensuing logic always performed. The special mode may be disabled by pressing the accessibility key or sequence of keys a second time.

Moving to block 402, the RC receives a first key selection. At block 404 the RC does not transmit the command to the DD but instead starts a threshold period counter.

Proceeding to diamond 406, the RC determines whether the threshold period has elapsed with no further key selections being received. If the period has elapsed, the logic transmits the command corresponding to the key at block 408.

On the other hand, if the threshold period has not yet elapsed, the logic moves to decision diamond 410, which represents another selection of the same key being received (if no other key selection is received the logic conceptually loops between diamonds 406 and 410 until the threshold period elapses, it being understood that state logic is encompassed in this description as well). Assuming the key pressed again at diamond 410 is the same (first) key, the logic moves to block 412 to announce, e.g., on speakers and/or visual display of the RC, the name of the key on the RC that has been pressed twice within the threshold period. Or, the RC can send a signal to the DD to announce the name of the first key.

If the key pressed at decision diamond 410 is not the first key but rather a different, second key, the logic may proceed in any one of several ways, such as resetting the threshold period and waiting for a second reception of the second key press, or by transmitting a command associated with the first key, or by transmitting a command associated with the second key, or by transmitting both commands, or by ignoring both key presses, and/or by announcing an error, etc.

From block 412 the logic moves to decision diamond 414 to determine whether a second press or double press of the first key has been received. Note that a second threshold period may be established from reception of the first double press in which to receive the second double press and if a second double press is received outside the second threshold period, the logic begins anew at the beginning. If a second double press is received (within the second threshold period if used), the logic moves to block 416 to announce (e.g., via speakers and/or visual display on the RC and/or DD) the function of the corresponding first key on the RC. From block 416 or from decision diamond 414 if the test there is negative, the logic can end at state 418.

While particular techniques are herein shown and described in detail, it is to be understood that the subject matter which is encompassed by the present application is limited only by the claims.

What is claimed is:

1. A system comprising:
   a display device (DD) configured to receive wireless commands from a remote control (RC);
   circuitry in the DD configured to:
   receive from the RC a first command but not execute the first command;
   responsive to not receiving the first command a second time within a time period, execute the first command; and
   responsive to receiving the first command a second time within the time period, not execute the first command and present information pertaining to a first key on the RC associated with the first command.

2. The system of claim 1, wherein the circuitry is configured to:
   responsive to receiving the first command the second time within the time period, not execute the command and present information pertaining to the first key on the RC associated with the first command, the information comprising a name of the first key.

3. The system of claim 1, wherein the circuitry is configured to:
   responsive to receiving the first command at least a third time, present enhanced information pertaining to the first key on the RC associated with the first command, the enhanced information comprising a function of the first key.

4. The system of claim 1, wherein the circuitry is configured for playing the information on the at least one speaker.

5. The system of claim 1, wherein the circuitry is configured for configuring the DD in a training mode responsive to receiving a command caused by selection of a special key on the RC, the training mode being associated with presenting the information associated with the first key.

6. The system of claim 1, wherein the circuitry is configured for configuring the DD in a training mode responsive to selection of plural keys on the RC, the training mode being associated with presenting the information associated with the first key.

7. The system of claim 1, comprising the RC.

8. A system comprising:
   a remote control (RC) with plural keys selectable to cause the RC to send respective wireless commands from a wireless transceiver of the RC to a display device (DD);
   circuitry in the RC configured to:
   receive a selection of a first key;
   responsive to receiving the selection of the first key, not transmit to the DD a command associated with the first key;
   responsive to not receiving a second selection of the first key within a time period, transmit to the DD a command associated with the first key; and
   responsive to receiving a second selection of the first key within the time period, present information pertaining to the first key.

9. The system of claim 8, wherein the circuitry is configured for playing the information on at least one speaker of the RC.

10. The system of claim 8, wherein the circuitry is configured for causing the DD to play the information on at least one speaker of the DD.

11. The system of claim 8, wherein the circuitry is configured for configuring the RC in a training mode responsive to receiving a command caused by selection of a special key on the RC, the training mode being associated with presenting the information associated with the first key.

12. The system of claim 8, wherein the circuitry is configured for configuring the RC in a training mode responsive to selection of plural keys on the RC, the training mode being associated with presenting the information associated with the first key.

13. The system of claim 8, wherein the circuitry is configured for:
   responsive to receiving the second selection of the first key within the time period, not execute the first command and present information pertaining to the first key, the information comprising a name of the first key.

14. The system of claim 8, wherein the circuitry is configured to:
   responsive to receiving at least a third selection of the first key, present enhanced information pertaining to the first key, the enhanced information comprising a function of the first key.

15. The system of claim 8, comprising the DD.

16. A device, comprising:
   at least one computer storage that is not a transitory signal and that comprises instructions executable by at least one processor for:

receiving at a display device (DD) a wireless first command from a remote control (RC); and starting a threshold period responsive to the first command but not executing the first command until the threshold period elapses;

presenting information related to a first key on the RC associated with the first command responsive to receiving the first command within the threshold period.

17. The device of claim 16, wherein the instructions are executable for playing on at least one speaker an audible indication of a name of the first key.

18. The device of claim 16, wherein the instructions are executable for playing on at least one speaker an audible indication of a function of the first key.

19. The device of claim 16, wherein the instructions are executable for, responsive to receiving the first command a second time, play on at least one speaker an audible indication of enhanced information pertaining to the first key.

20. The device of claim 16, wherein the instructions are executable for presenting the information and not executing the first command only responsive to being configured in a training mode.

* * * * *